(12) United States Patent
Kilpatrick et al.

(10) Patent No.: US 8,395,629 B1
(45) Date of Patent: Mar. 12, 2013

(54) REDUCING DATA STORED IN A DEEP-FRAME BUFFER

(75) Inventors: Charlie A. Kilpatrick, San Francisco, CA (US); Brian W. Smith, Novato, CA (US)

(73) Assignee: Lucasfilm Entertainment Company Ltd., San Francisco, CA (US)

(*) Notice: Subject to any disclaimer, the term of this patent is extended or adjusted under 35 U.S.C. 154(b) by 1199 days.

(21) Appl. No.: 11/964,924

(22) Filed: Dec. 27, 2007

Related U.S. Application Data

(60) Provisional application No. 60/986,897, filed on Nov. 9, 2007.

(51) Int. Cl.
*G06T 1/00* (2006.01)
(52) U.S. Cl. ......... 345/522; 345/426; 345/501; 345/643
(58) Field of Classification Search .................. 345/582, 345/545, 557
See application file for complete search history.

(56) References Cited

U.S. PATENT DOCUMENTS

| | | | | |
|---|---|---|---|---|
| 6,339,428 B1 * | 1/2002 | Fowler et al. | ................. | 345/582 |
| 7,889,205 B1 * | 2/2011 | Parenteau et al. | ............. | 345/545 |
| 2006/0098022 A1 * | 5/2006 | Andrews et al. | ............. | 345/557 |

OTHER PUBLICATIONS

Ian Buck, Tim Foley, Daniel Horn, Jeremy Sugerman, Kayvon Fatahalian, Mike Houston, and Pat Hanrahan. 2004. Brook for GPUs: stream computing on graphics hardware. In ACM SIGGRAPH 2004 Papers (SIGGRAPH '04), Joe Marks (Ed.). ACM, New York, NY, USA, 777-786. DOI=10.1145/1186562.1015800 http://doi.acm.org/10.1145/1186562.1015800.*
Bleiweiss et al., Advanced Shading Language, ATI Research Silicon Valley, Inc., presentation, 2003, 14 pages.
Bleiweiss et al., Ashli-Advanced Shading Language Interface, ATI Research, Inc., 2003, pp. 13-1 to 13-21.
Kilgard, NVIDIA Corporation, Austin, TX, Jan. 16, 2003, pp. 1-2.
Ragan-Kelley, "Practical Interactive Lighting Design for RenderMan Scenes," thesis, May 2004, 70 pages.
Ragan-Kelley, "The Lightspeed Automatic Interactive Lighting Preview System," paper submitted at the Massachusetts Institute of Technology, May 2007, 59 pages.
Pellacini et al., "Lpics: a hybrid hardware-accelerated relighting engine for computer cinematography," *SIGGRAPH*, 2005, 7 pages.
Pellacini, "User-configurable automatic shader simplification," *SIGGRAPH*, 2005, 8 pages.
Guenter et al., "Specializing shaders," *SIGGRAPH*, 1995, 8 pages.
Knoblock and Ruf, "Data Specialization," *SIGPLAN Notices Conference*, 1996, 31(5):215-225.

* cited by examiner

*Primary Examiner* — Xiao M. Wu
*Assistant Examiner* — Phi Hoang
(74) *Attorney, Agent, or Firm* — Fish & Richardson P.C.

(57) ABSTRACT

The subject matter of this specification can be embodied in, among other things, a method that includes generating intermediate values from an evaluation of one or more static expressions within shader programming code that is configured to modify an appearance of an image, compressing the intermediate values based on a determination of which intermediate values are duplicative, and storing the compressed intermediate values in a buffer accessible to an image rendering application.

18 Claims, 6 Drawing Sheets

REDUCING DATA STORED IN A DEEP-FRAME BUFFER

CROSS-REFERENCE TO RELATED APPLICATIONS

This application claims priority to U.S. Application Ser. No. 60/986,897, filed on Nov. 9, 2007, and entitled "Reducing Data Stored in a Deep-Framebuffer", the contents of which are hereby incorporated by reference.

TECHNICAL FIELD

Implementations are described, relating to computer animation, for example, compressing data in a buffer for use in image rendering.

BACKGROUND

Rendering is the process of generating an image from a model by means of computer programs. The model can include a description of three-dimensional objects using a particular language or data structure. A model can contain information such as geometry, viewpoint, texture, lighting, and shading information. The image may be a digital image or raster graphics image. A renderer can be used to produce a sequence of frames, yielding an animation.

Rendering has uses in architecture, video games, simulators, movie or TV special effects, and design visualization. As a product, a wide variety of renderers are commercially available. Some are integrated into larger modeling and animation packages, and some are stand-alone.

In the case of three-dimensional (3D) graphics, rendering may be a slow and expensive process. Rendering effects based on configuring (or re-configuring) lighting shaders, and other shaders, can create a critical bottleneck in a production pipeline due to computational demands. Some renderers use buffers such as deep-framebuffers, to cache results of calculations performed during the rendering process. A deep-framebuffer can cache static values such as normals and texture samples in image space. Each time a user updates shader parameters (e.g., lighting parameters), real-time shaders can interactively recompute the image using the values in the cache as well as dynamically generated values based on the updated shader parameters.

SUMMARY

In general, systems and methods are described for compressing data in a buffer for use in image rendering.

In a first general aspect, a computer-implemented method is described. The method includes generating intermediate values from an evaluation of one or more static expressions within shader programming code that is configured to modify an appearance of an image, compressing the intermediate values based on a determination of which intermediate values are duplicative, and storing the compressed intermediate values in a buffer accessible to an image rendering application.

In a second general aspect, a computer-implemented method is described that includes compressing intermediate values generated from an evaluation of one or more static expressions within shader programming code based on a determination of which intermediate values are duplicative and storing the compressed intermediate values in a memory buffer accessible to an image rendering application.

In another general aspect, a system is described. The system includes an expression evaluator for generating intermediate values based on one or more static expressions within shader programming code that is configured to modify an appearance of an image, a value comparison module for identifying duplicative intermediate values, and a value compression module to replace one or more of the identified duplicative intermediate values with a single representation and to output the single representation to a buffer accessible to an image rendering application.

In yet another general aspect, a computer-implemented method is described that includes generating, based on an evaluation of expressions included in a shader application, values associated with shading samples that are substantially the same during multiple image re-renderings by an image rendering application. The method also includes identifying substantially similar values within the generated values, and compressing the generated values for storage in a framebuffer accessible to the image rendering application by replacing the identified substantially similar values with a single representation.

The systems and techniques described here may provide one or more of the following advantages. For example, the amount of time spent performing subsequent renderings of an image can be reduced. Further, an amount of memory used during rendering an image can be reduced. In addition, lossless compression of data used in rendering an image can be achieved. Moreover, compression techniques easily used in conjunction with processing algorithms of a graphics processing unit can be implemented.

Implementations of the systems and methods are set forth in the accompanying drawings and the description below. Other features and advantages of the described systems and methods will be apparent from the description, drawings, and the claims.

DESCRIPTION OF DRAWINGS

Like reference symbols in the various drawings indicate like elements.

DETAILED DESCRIPTION

Figure 1:
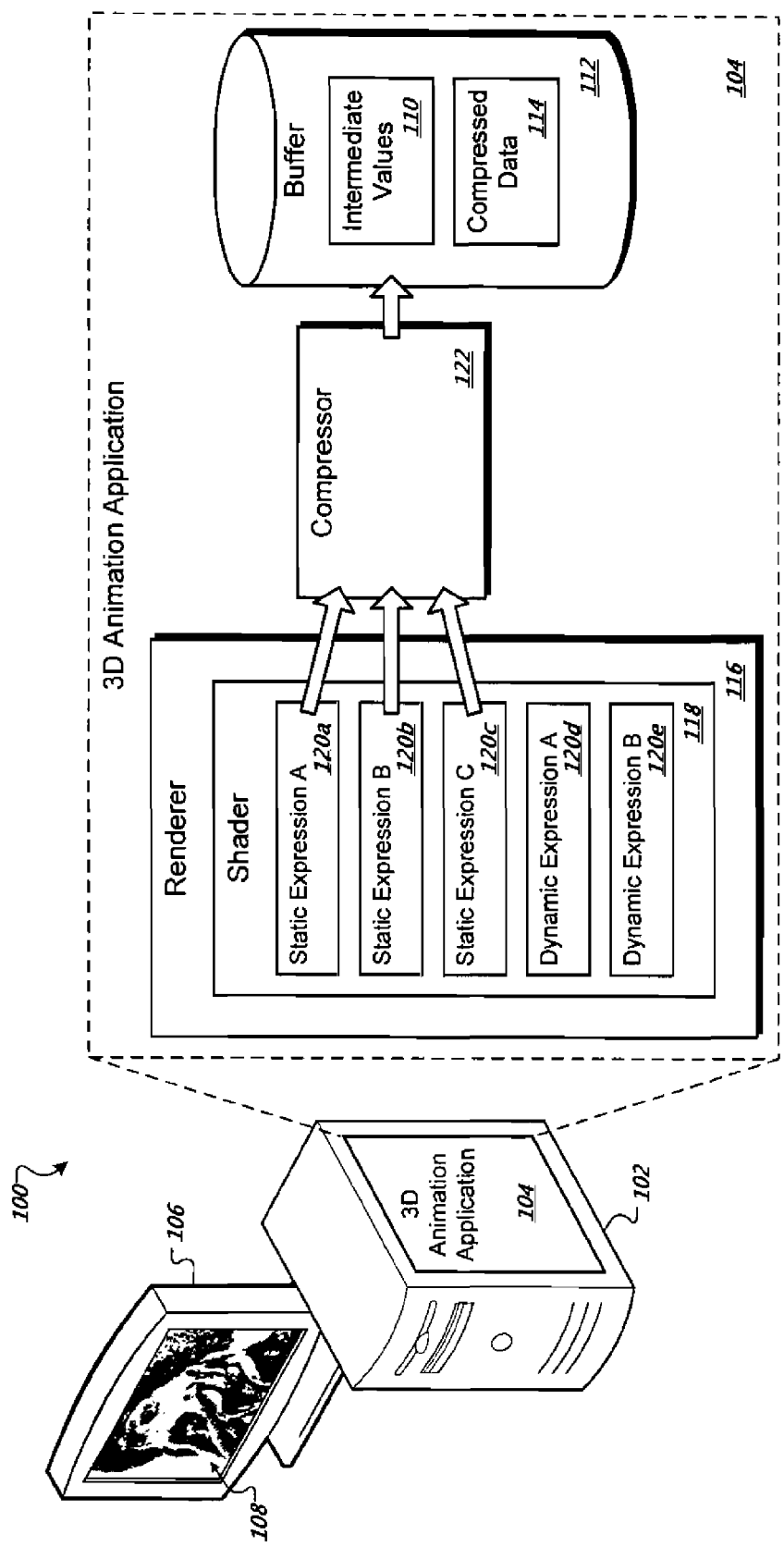
FIG. 1 is a block diagram showing an example of a system for compressing data in a buffer for use in image rendering.

Large amounts of data may be stored in a deep-framebuffer during an image rendering process. This data can include static values that remain the same even when variables in a three-dimensional (3D) scene are changed. For example, values for the texture of an object can remain the same even as an animation artist changes lighting applied to a 3D scene being rendered. When a scene is re-rendered, a rendering system can retrieve cached static values instead of calculating them again. In such an implementation, the rendering system only has to calculate dynamic expressions that output changing values based on modified scene parameters such as lighting in a 3D scene. The rendering system can combine dynamically calculated values and the cached static values to re-generate, or re-render, the modified scene.

As mentioned above, large amounts of data may be cached for a scene. Fetching all of this data can create long latencies between modifying a 3D scene's parameters and a final (or preview) rendering of the scene. In some implementations, compressing the cached data can decrease the latency required to render a 3D scene. In one implementation of a compression scheme, if two or more static expressions produce duplicative sets of values across all samples of a scene, the duplicative sets can be replaced with a single set. In other words, if two or more static expressions produce the same values when applied to the samples of a scene, one set of values can be stored and associated with the two or more expressions.

In another implementation of a possible compression scheme, if a static expression produces the same value when applied to all samples of a scene (i.e., the static expression only produces one value regardless of the sample to which it is applied), the duplicate values can be removed and replaced with a single value for the static expression.

Storing the values of the static expressions in a compressed state can decrease data access and retrieval time when re-rendering a 3D scene because less data is involved in the re-rendering process. This is discussed more fully below.

The term "sample" as used in this specification typically refers to a shading sample, or a point sample within the 3D scene at which "shaders" are executed in order to, for example, compute a color, or perform one or more of the rendering functions described above. The 3D scene can include portions that ultimately are not visible in a final displayed image, thus a shading sample can be at either a visible or non-visible location within the scene.

In a case where a shading sample is at a non-visible location within the scene, the shading sample may not ultimately contribute to the color of any pixel of the final image. In a case where a shading sample is at a visible location within the scene, the visible shading sample may contribute to the color of one or more pixels of the final image. Depending on how the shading sample locations are chosen and the method by which the shading samples are chosen to contribute to the colors of the pixels within the final image, a shading sample can have a one-to-one correspondence with a pixel, or a single shading sample may ultimately contribute to the color that is calculated for zero, one or multiple pixels within the final image.

As noted above, the term "sample" is used throughout the specification but typically refers to a shading sample unless the context dictates otherwise.

FIG. 1 is a block diagram showing an example of a system 100 for compressing data in a buffer for use in image rendering. The example system 100 includes a computer system 102. The computer system 102 includes a three-dimensional (3D) animation application 104, which renders images for display on a display device 106 such as an image 108. The images can form a sequence of images used in an animation or video media. The 3D animation application 104 renders the images from parameters and expressions that describe the images such as a 3D structure, or model, of a shape in the images, a surface texture of the shape, and properties of light sources in the images. The 3D animation application 104 can perform calculations using the parameters and expressions to render an object's color, light reflection, etc., in the images.

The 3D animation application 104 can store results of some calculations as intermediate values 110 in a buffer 112. The buffer 112 may be, for example, a deep-framebuffer for use in preview rendering or final-frame rendering. The 3D animation application 104 may access the intermediate values 110 in a subsequent rendering of images. Where intermediate values are duplicative, the 3D animation application 104 can compress the duplicative intermediate values and store the duplicative intermediate values as compressed data 114.

The 3D animation application 104 also can include a renderer 116. In some implementations, the renderer 116 performs the rendering of images for display on the display device 106. The renderer 116 may be a development application such as an application that renders preview images for developing 3D animations or video. Alternatively, the renderer 116 may be an end-user application for presenting images in an animation or video. The renderer 116 includes one or more shaders such as a shader 118, that perform functions including calculating the color or texture of an object.

The shader 118 evaluates expressions in shader programming code to generate intermediate values. In some implementations, the shader 118 may be a fixed shader that has shader programming code developed to generate a color or texture according to a predetermined shading model, for example. In other implementations, the shader may be a procedural shader that calculates an object's color according to a user-specified shading model, using, for example, fractal noise or turbulence functions to simulate randomness occurring in coloring or textures.

In some implementations, a fixed shader uses a shading model that is determined at the time that the renderer is written. The code that implements a fixed shader "ships" with the renderer. After the renderer ships, a subsequent user of the renderer can not change the shading model that a fixed shader implements. In contrast, in some implementations, a procedural shader can be user-written (e.g., by a subsequent user of the renderer) after the renderer is shipped from the developer or developers and can be implemented using a shading model that the user specifies.

Shader programming code may be written in one or more shading languages for execution using a central processing unit (CPU) or a graphics processing unit (GPU). Examples of shading languages include the C for Graphics (Cg) shading language, the RenderMan Shading Language (RSL), the High Level Shading Language (HLSL), and the OpenGL Shading Language (GLSL).

The shader 118 includes multiple shader expressions 120a-e. The expressions 120a-c are identified as static expressions. That is, the intermediate values generated from the expressions 120a-c typically do not change as input parameters to the shader 118 are changed. For example, static expressions may include the texture for an object that does not change when an animation artist changes lighting parameters for a scene. The expressions 120d-e are identified as dynamic expressions. That is, the intermediate values generated from the expressions 120d-e typically change as input parameters to the shader 118 are changed. For example, the dynamic expressions can include the color of an object that does change when the animation artist repositions a light in the scene so that it shines more directly on the object, thus changing the object's color. The static and dynamic expressions 120a-e may be identified manually by a user or programmatically using an algorithm.

For example, the shader 118 may include the following code:

```
color shader (float i, float j, float k)
{
    float val = dotProduct (2, i, j, k) / 10.0;
    return color (val, val, val);
}
float dotProduct (float x1, float y1, float x2, float y2)
{
    return      x1 * // where x1 is a static expression A
                x2 + // where x2 is a static expression B
                y1* // where y1 is a static expression C
                y2; // where y2 is a dynamic expression D
}
```

The shader 118 includes two functions—"shader" and "dotProduct," where the shader function invokes the dotProduct function. The shader function calculates a color for a sample given three input parameters "i," "j," and "k." In one example, the user can indicate that the input parameter k is dynamic. That is, the user can indicate that the parameter k is dynamic, for example, where multiple renderings are performed using multiple values of the parameter k. Correspondingly, the expressions that depend on the input parameter k are identified as dynamic expressions. Expressions that do not depend on the parameter k or other dynamic parameters may be identified as static expressions. The intermediate values determined from the static expressions are compressed and stored in the buffer 112. In some implementations, the dotProduct function is translated to access compressed intermediate values from the buffer 112.

In the exemplary code above, the input parameter k from the shader function is passed to the dotProduct function as parameter "y2." The parameter y2 can correspond to a property of a 3D scene such as the angle or intensity of a light source. A user can modify the parameter y2, for example, during successive preview renderings of an image during development of an animation.

Parameters "x1," "x2," and "y1" are identified as static expressions. In some implementations, the parameters x1, x2, and y1 do not change during successive preview renderings of the image. The intermediate values associated with the parameters x1, x2, and y1 are stored in the buffer 112 and then retrieved from the buffer 112 during successive preview renderings of the image. In some implementations, the dotProduct function above includes a label or identifier for each of the static expressions. The identifiers or labels can indicate locations in the deep-framebuffer at which the intermediate values are stored.

In some implementations, the shaders are evaluated with different input parameters at multiple sample locations in order to form an image. As mentioned above, a sample location at which the shaders are evaluated can be referred to as a "sample" or "shading sample". An image can be made up of components such as pixels. In some implementations, a single shading sample is evaluated per pixel in the final image. In other implementations, more than one shading sample may contribute to a given pixel in the final image. The same shading sample may contribute with a different weight to zero, one, or multiple pixels in the final image.

In the implementation of FIG. 1, the renderer 116 applies the expressions 120a-e in the shader 118 to the input parameters to generate the intermediate values. For example, a set of samples may have associated values for the input parameters i and j to the shader function such as sample p input parameters (3, 3), sample q input parameters (1, 1), and sample r input parameters (0, 0). The shader function passes the value two and the input parameters i and j to the dotProduct function (as well as a value for the dynamic parameter k). The renderer 116 generates sets of intermediate values for sample p (2, 3, 3), sample q (2, 1, 1), and sample r (2, 0, 0) from applying the static expressions 120a-c to the input parameter sets (3, 3), (1, 1), and (0, 0), respectively. In some implementations, a set of intermediate values resulting from the application of a static expression to a set of input parameters for the samples is referred to as a channel. The channel resulting from applying the expression 120a for the samples p, q, and r is (2, 2, 2). The channel resulting from applying the static expression 120b for the samples p, q, and r is (3, 1, 0). The channel resulting from applying the static expression 120c for the samples p, q, and r is also (3, 1, 0).

In some implementations, the renderer 116 passes the generated intermediate values to a compressor 122, and the compressor 122 identifies intermediate values to compress based on whether duplicative values are present in the intermediate values.

In one example of compression, the compressor 122 identifies the intermediate values within a channel as duplicates of one another. That is, the channel may have a uniform value. For example, the intermediate values 0-n in a channel (e.g., $2_0, 2_1, \ldots 2_n$) associated with the static expression 120a can have a uniform value of "2." The compressor 122 may store the uniform value "2" as the compressed data 114 rather than storing each of the intermediate values from the channel ($2_0, 2_1, \ldots 2_n$).

In some implementations, the compressor 122 may identify nearly uniform channels as candidates for compression such as a set of intermediate values within a predetermined level of uniformity. For example, the compressor 122 may determine that a channel having intermediate values within a particular numerical range such as 0.0001, are sufficiently uniform to be compressed as a uniform value. For example, if all the values within a channel fall within the predetermined variance, the values can be averaged together to determine a value to store. Alternatively, a median value can be selected and stored.

The compressor 122 may store an identifier of the compressed intermediate values such as an identifier or location of the channel and/or the static expression 120a associated with the compressed intermediate values. The renderer 116 may use the identifier to locate and retrieve the appropriate uniform value during subsequent renderings of the image that access the intermediate values from the compressed channel.

In another example of compression, the compressor 122 may identify two or more channels as being duplicates of one another. That is, the corresponding intermediate values of two or more channels may be identical. For example, the channel (3, 1, 0) associated with the expression 120b and the channel (3, 1, 0) associated with the expression 120c have identical corresponding intermediate values. In this example, each channel has a value of "3" resulting from, for example, applying the static expressions 120b and 120c to the first value of input parameters (such as i and j previously given as examples), a value of "1" resulting from applying the static expressions 120b and 120c to the second value of the input parameters i and j, and a value of "0" resulting from applying the static expressions 120b and 120c to the third value of the input parameters i and j.

The compressor 122 identifies the channel associated with the expression 120c as a duplicate of the channel associated with the expression 120b. The compressor 122 may store a link to the channel associated with the expression 120b in the compressed data 114 rather than storing each of the intermediate values from the duplicate channel associated with the expression 120c.

In some implementations, the compressor 122 may identify nearly identical channels as candidates for compression such as channels having corresponding intermediate values within a predetermined level. For example, the compressor 122 may determine that channels having corresponding intermediate values within a particular numerical range such as 0.0001, are sufficiently identical to be compressed as identical channels. In some implementations, the compressor can select values to store using the average and median as described previously.

The compressor 122 may store an identifier of the compressed intermediate values such as an identifier or location of the compressed channel and/or the static expression 120c. The renderer 116 may use the identifier to locate and retrieve the link to the static expression 120b during subsequent renderings of the image that access the intermediate values from the compressed channel.

In some implementations, the compressor 122 determines the compressed data 114 before storing any corresponding uncompressed intermediate values in the buffer 112. For example, the compressor 122 may store the uniform value of "2" associated with a channel without storing the individual intermediate values of the channel in the buffer 112 (e.g., $2_0$, $2_1$, ... $2_n$). In one implementation, this can be performed by examining the individual intermediate values as they are evaluated; that is, as the values are examined, as long as the same uniform value "X" is encountered, the intermediate values are not stored in buffer 112. Instead a counter is incremented that keeps track of the number of "X" values that have been encountered for that static expression since the beginning. Additionally, the uniform value "X" can itself be recorded into memory. If a distinct value from "X" for the static expression is not encountered after evaluating all samples, then a determination is made that the channel is uniform and the single uniform value is stored in the compressed data 114. However, upon encountering the first distinct value from "X", it can be determined that the values of the channel are not uniform, and the corresponding uncompressed intermediate values 110 can be filled in using the counter, which indicates the number of values "X" that should be entered into the uncompressed buffer. After this, values for the non-uniform static expression are recorded in the uncompressed intermediate value buffer as they are evaluated.

In another implementation, the compressor may identify identical channels prior to storing the redundant channels into the uncompressed intermediate values 110. In one implementation, the static expressions are first evaluated in an order such that for each sample, all of the static expressions of a shader are evaluated for a sample, prior to moving on to evaluate the static expressions of the shader for the next sample. As the static expressions are evaluated for a given sample, a data structure records those channels that are so far identical to another channel or channels across all of the samples that have been evaluated thus far. For a set of channels that have been identified as being identical to each other across the samples evaluated thus far, only the intermediate values for one of the channels in the set are recorded. As the static expressions for subsequent samples are evaluated, if a point is reached where a channel is determined to no longer be identical to any other channel, then the intermediate values for that channel can be immediately stored into the uncompressed intermediate values 110. Additionally, as the static expressions for subsequent samples are evaluated after this, the intermediate values 110 continue to be recorded for those non-identical channels. However, if there are identical channels after finishing with all samples, then only the intermediate values for one of the channels in a set of identical channels is recorded in the uncompressed intermediate values 110.

In some implementations, uniform channels and identical channels are both identified prior to storing redundant intermediate values in the buffer 112.

Alternatively, the compressor 122 and/or the renderer 116 can store the intermediate values from the channel (e.g., $2_0$, $2_1$, ... $2_n$) in the buffer 112 and later remove the duplicative intermediate values in a post-storage compression process.

Figure 2:
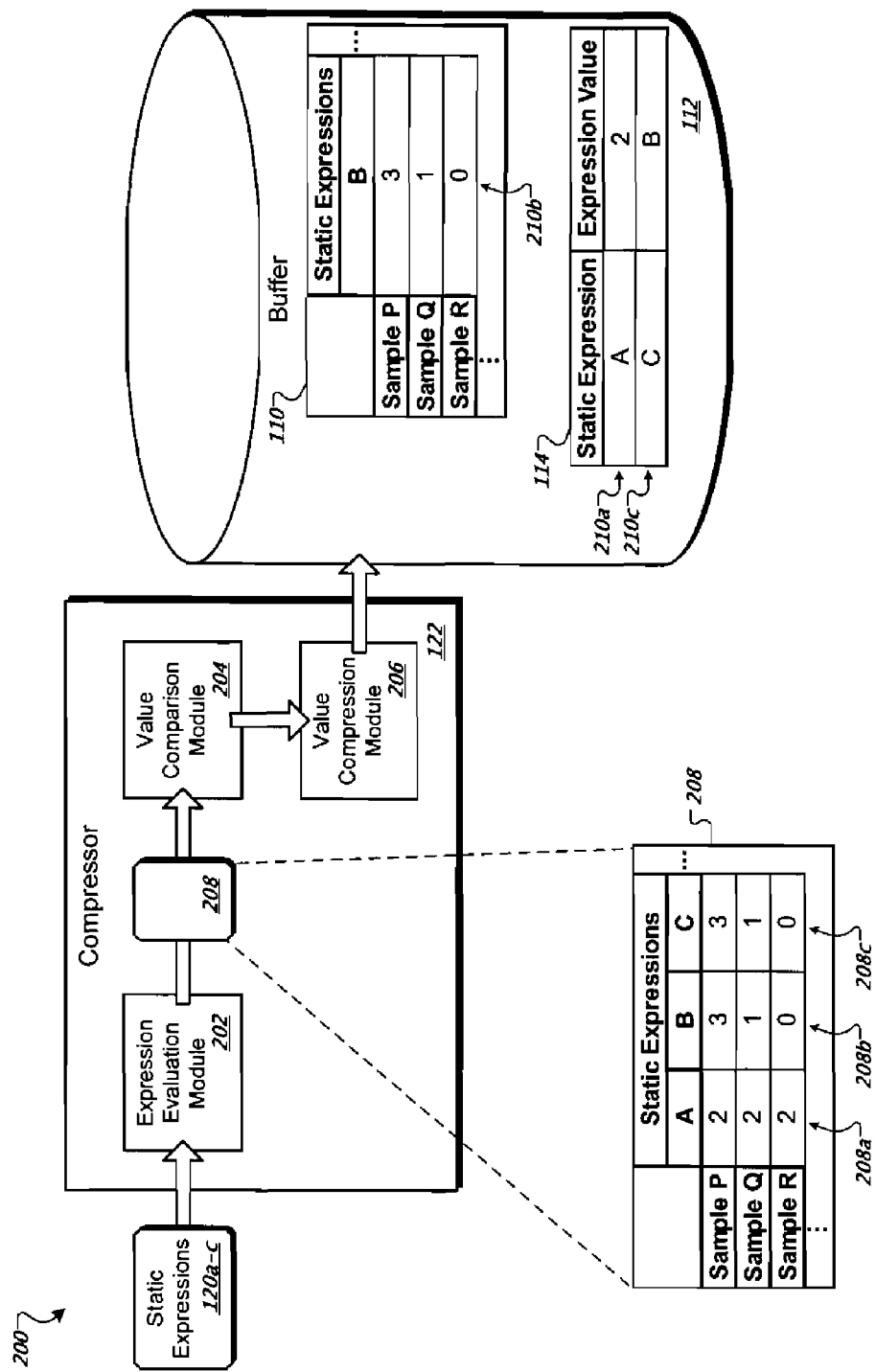
FIG. 2 is a block diagram showing another example of a system for compressing data in a buffer for use in image rendering.

FIG. 2 is a block diagram showing an example of a system 200 for compressing data in a buffer for use in image rendering. The system 200 includes the compressor 122 and the buffer 112 shown in more detail according to one implementation. In this implementation, the compressor 122 includes an expression evaluation module 202, a value comparison module 204, and a value compression module 206.

The expression evaluation module 202 receives the static expressions 120a-c. The expression evaluation module 202 applies each of the static expressions 120a-c to the values of the input parameters. The expression evaluation module 202 sends uncompressed intermediate values 208 resulting from the evaluation to the value comparison module 204. In this example, the uncompressed intermediate values 208 include multiple channels 208a-c. The channel 208a includes the intermediate values (2, 2, 2) resulting from applying the static expression 120a to the input parameters. The channel 208b includes the intermediate values (3, 1, 0) resulting from applying the static expression 120b to the input parameters. The channel 208c includes the intermediate values (3, 1, 0) resulting from applying the static expression 120c to the input parameters. In some implementations, the renderer 116 evaluates the static expressions 120a-c and sends the uncompressed intermediate values 208 to the value comparison module 204.

The value comparison module 204 determines if duplicative values exist in the uncompressed intermediate values 208. In one example, the value comparison module 204 compares intermediate values within a channel to one another to determine if the channel has a uniform value (e.g., the channel 208a).

In another example, the value comparison module 204 compares intermediate values in a first channel to corresponding intermediate values in a second channel. For example, the value comparison module 204 can compare the channels 208b and 208c and determine that the channels 208b-c have the same intermediate value of "3" for the sample p, the same intermediate value of "1" for the sample q, and the same intermediate value of "0" for the sample r.

The value comparison module 204 sends the intermediate values 208, along with an indication that the channels 208a and 208c contain duplicates, to the value compression module 206. The value compression module 206 compresses the channels 208a and 208c based on the duplication identified by the value comparison module 204. For example, the value comparison module 204 eliminates the values in channel 208c. Next, the value compression module 206 can store the compressed data 114 and the uncompressed intermediate values 110 in the buffer 112.

In another implementation, if a channel has a series of uniform values, the value compression module 206 can compress the channel so that it is associated with a single data value and an identifier indicating that all of the samples within the channel have that data value. For example, the value compression module 206 can compress the channel 208a, which includes the intermediate values (2, 2, 2), into a single value of "2" and an identifier indicating the value "2" is applicable to all samples within the channel 208a. In certain implementations, the value compression module 206 stores the uniform value of "2" and the associated identifier in the buffer 112 as compressed data 210a.

In the case of a first channel that is identical to a second channel, the value compression module 206 compresses the first channel into a single link to the second channel. For example, the value compression module 206 may receive the intermediate values for the channel 208b and an indication that the channel 208c is identical to the channel 208b. The value compression module 206 stores the channel 208b in the buffer 112 as intermediate values 210b. The value compression module 206 compresses the channel 208c by representing it using a pointer, or link, associated with the intermediate values 210b stored in the buffer 112 as compressed data 210c. The intermediate values 110 and/or the compressed data 114 may be retrieved, for example, by the renderer 116 during subsequent rendering operations of the image 108.

Figure 3:
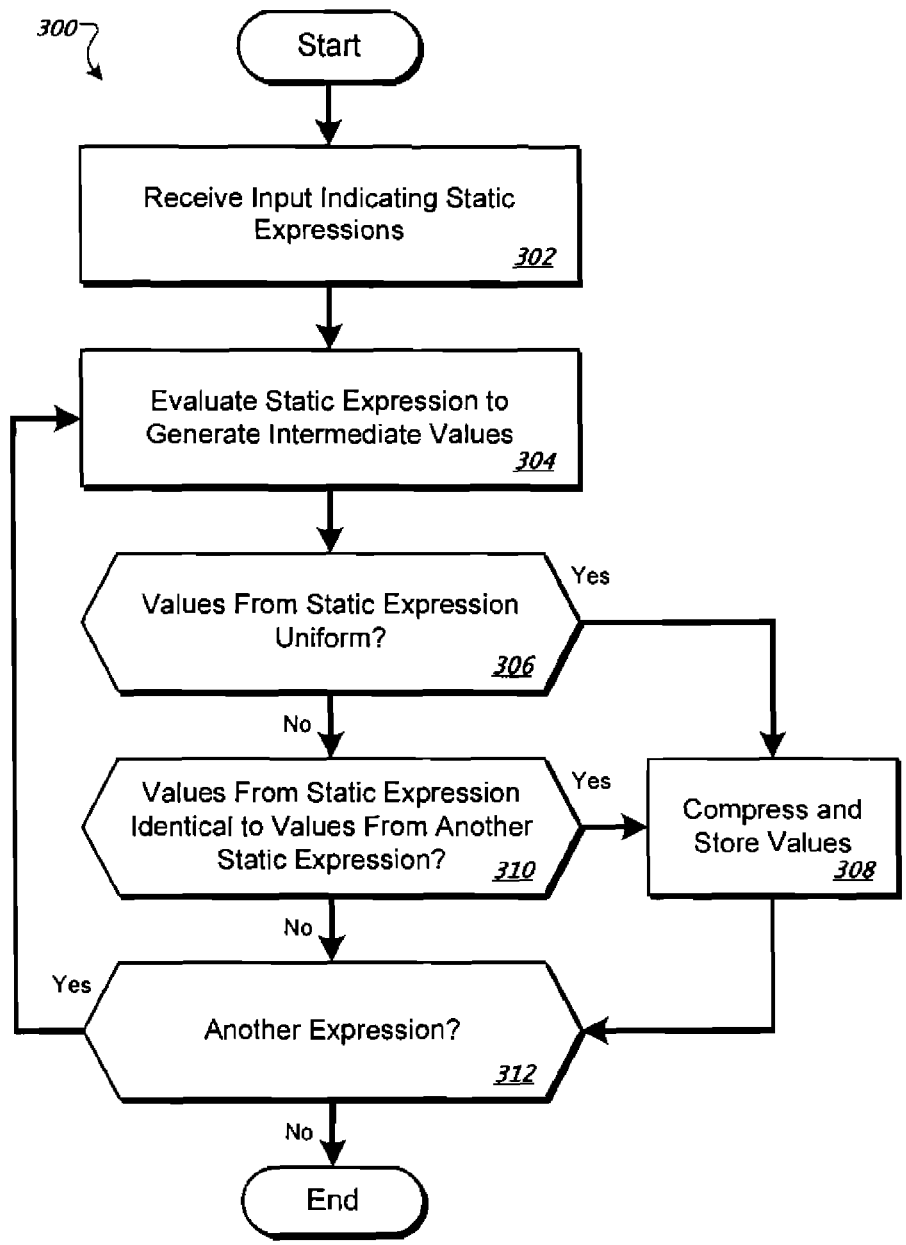
FIG. 3 is a flow chart showing an example of a process for compressing data in a buffer for use in image rendering.

FIG. 3 is a flow chart showing an example of a process 300 for compressing data in a buffer for use in image rendering. The process 300 may be performed, for example, by a system such as the systems 100 and 200. For clarity of presentation, the description that follows uses the systems 100 and 200 as the basis of an example for describing the process 300. However, another system, or combination of systems, may be used to perform the process 300.

The process 300 begins with receiving (302) an input indicating static expressions among expressions within shader programming code used with, for example, an image preview renderer. For example, the expression evaluation module 202 can receive an input indicating that the expressions 120a-c are static.

The process 300 evaluates (304) a static expression to generate intermediate values for shading samples. For example, the expression evaluation module 202 and/or the renderer 116 evaluate the expressions 120a-c to generate the intermediate values 208 for the shading samples p, q, and r.

If the intermediate values generated from the static expression are uniform (306), then the process 300 compresses and stores (308) the intermediate values. For example, the value comparison module 204 identifies that the channel 208a has a uniform value of "2." The value compression module 206 compresses the channel 208a into the compressed data 210a, which includes an identifier of the channel 208a and the uniform value. The value compression module 206 stores the compressed data 210a in the buffer 112.

Otherwise, if the intermediate values generated from the static expression are identical to intermediate values generated from another static expression (310), then the process 300 compresses and stores (308) the intermediate values. For example, the value comparison module 204 identifies the channel 208c as identical to the channel 208b. The value compression module 206 compresses the channel 208c into the compressed data 210c, which includes a link to the intermediate values 210b and an identifier of the channel 208c. The value compression module 206 stores the compressed data 210c in the buffer 112.

If there is another static expression remaining for evaluation (312), then the process 300 evaluates (304) the remaining static expression and intermediate values generated from the remaining static expression may be compressed. Otherwise, if there are no remaining static expressions for evaluation (312), then the process 300 ends.

Figure 4:
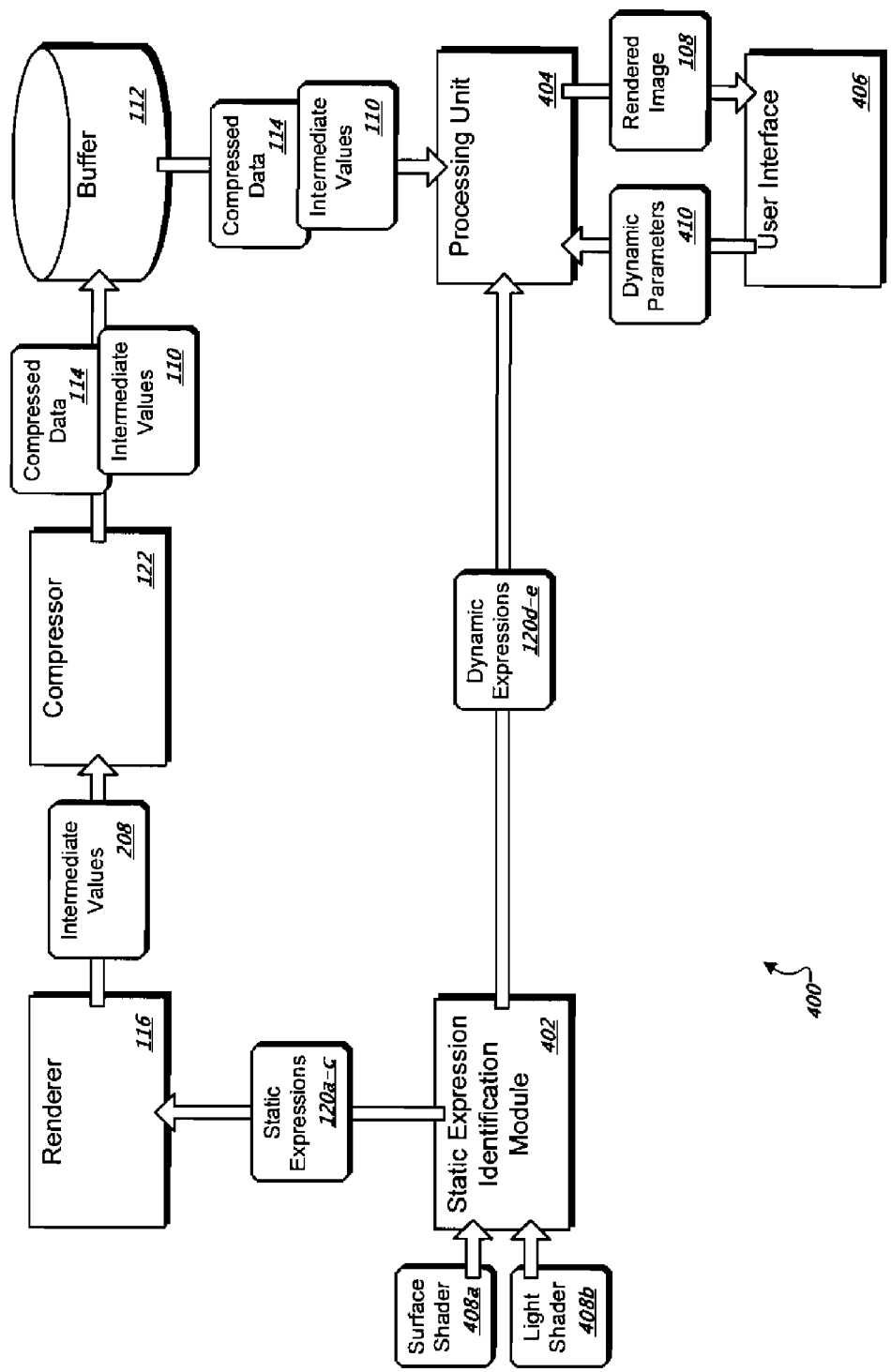
FIG. 4 is a block diagram showing an example of a system for compressing data in a buffer for use in image rendering and for generating image renderings.

FIG. 4 is a block diagram showing an example of a system 400 for compressing data in a buffer for use in image rendering and for generating image renderings. The system 400 includes a static expression identification module 402, a processing unit 404, and a user interface 406 in addition to the renderer 116, the compressor 122, and the buffer 112 previously described.

The static expression identification module 402 identifies one or more static expressions within shaders 408a-b. The shaders 408a-b can be, for example, surface shaders or light shaders. In some implementations, the identification of static expressions is based on the type of shader, for example, whether or not the shader is a surface shader or a light shader. The static expression identification module 402 sends the identified static expressions 120a-c to the renderer 116.

As previously described, in certain implementations, the renderer 116 evaluates the static expressions 120a-c to generate the intermediate values 208. The compressor 122 compresses the intermediate values 208 into compressed data 114. The compressor 122 can store the compressed data 114 and the intermediate values 110 in the buffer 112.

The static expression identification module 402 sends the dynamic expressions 120d-e to the processing unit 404. The static expression identification module 402 may translate the dynamic expressions 120d-e, for example, to access intermediate values and/or compressed data from the buffer 112. For example, the dotProduct function shown above may be translated to reference the previously evaluated values of the static expressions 120a-c that are stored in the buffer 112. The translated dotProduct function may then be executed by the processing unit 404.

The processing unit 404 may be, for example, a graphics processing unit (GPU) or a central processing unit (CPU). The processing unit 404 retrieves the compressed data 114 and the intermediate values 110 from the buffer 112. The user interface 406 receives one or more dynamic parameters 410. For example, a user may make an input using the user interface 406 to change a property or parameter of a light shader. The processing unit 404 uses the static expressions 120a-c and the dynamic expressions 120d-e to generate the rendered image 108. The values of the previously evaluated static expressions 120a-c are accessed using the compressed data 114 and the intermediate values 110. The dynamic expressions 120d-e are evaluated using the dynamic parameters 410 along with the values of the previously evaluated static expressions 120a-c that were stored in the buffer 112. In this example, the processing unit 404 outputs the rendered image 108 to the user through the user interface 406.

The user may make further inputs to change the dynamic parameters 410. The processing unit 404 again uses the values of the previously evaluated static expressions 120a-c and the dynamic expressions 120d-e to generate the rendered image 108. The processing unit 404 outputs a newly rendered image based on the previously evaluated values of the static expressions 120a-c using the compressed data 114 and the intermediate values 110, and the evaluation of the dynamic expressions 120d-e using, for example, both the dynamic parameters 410 and data from buffer 112.

Figure 5:
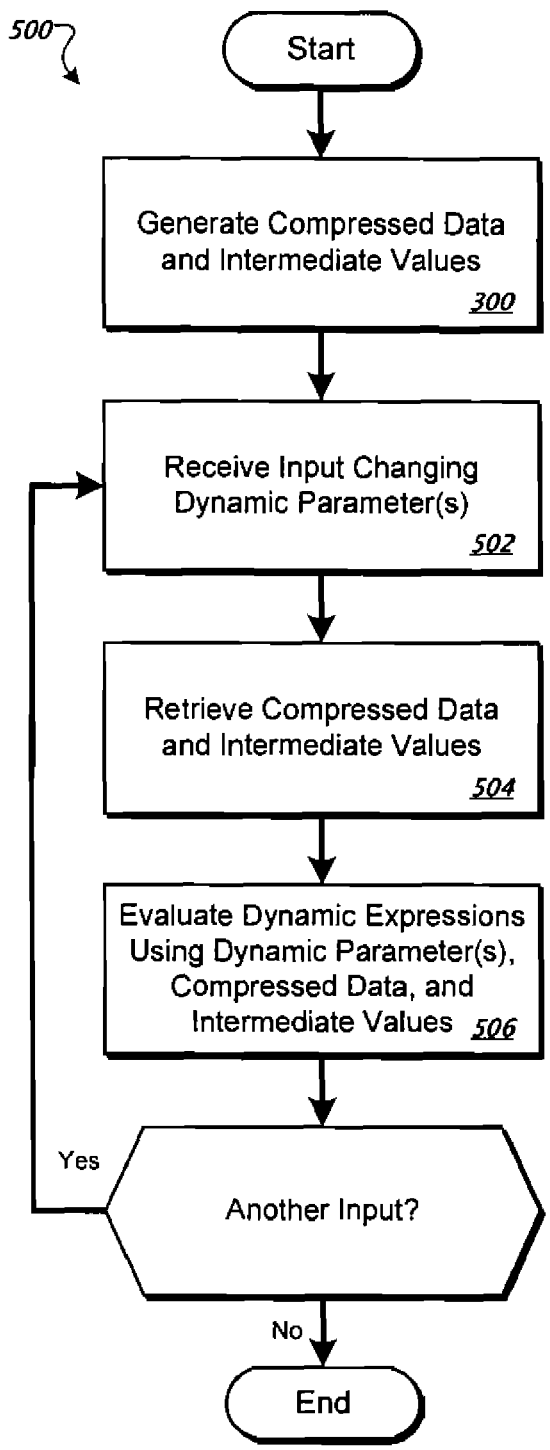
FIG. 5 is a flow chart showing an example of a process for compressing data in a buffer for use in image rendering and for generating image renderings.

FIG. 5 is a flow chart showing an example of a process 500 for compressing data in a buffer for use in image rendering and for generating image renderings. The process 500 may be performed, for example, by a system such as the system 400. For clarity of presentation, the description that follows uses the system 400 as the basis of an example for describing the process 500. However, another system, or combination of systems, may be used to perform the process 500.

The process 500 begins with generating (300) compressed data and intermediate values for use in image rendering. For example, the compressor 122 generates the compressed data 114 and the intermediate values 110. The compressor 122 stores the compressed data 114 and the intermediate values 110 in the buffer 112.

The process 500 receives (502) an input changing one or more dynamic parameters of an image rendering. In some implementations, a user may make an input using the user interface 406 to change the dynamic parameters 410. For example, an animation artist can reposition a light within a 3D scene. Repositioning the light changes dynamic parameters associated with the light such as intensity, reflection, direction, etc.

The process 500 retrieves (504) the compressed data and the intermediate values. For example, the processing unit 404 retrieves the compressed data 114 and the intermediate values 110 from the buffer 112.

The process 500 evaluates (506) dynamic expressions using the dynamic parameters, the compressed data, and the intermediate values. For example, the processing unit 404 evaluates the dynamic expressions 120$d$-$e$ using the dynamic parameters 410, the compressed data 114, and the intermediate values 110. The processing unit 404 outputs the rendered image 108 resulting from the evaluated expressions 120$a$-$e$ to the user through the user interface 406.

If another input is made changing one or more dynamic parameters (508), then the process 500 receives (502) the input. For example, an animation artist can make several changes to objects within a scene, render the scene, and then make additional changes before rendering the scene again. Otherwise, if no more inputs are made, the process 500 can end.

Figure 6:
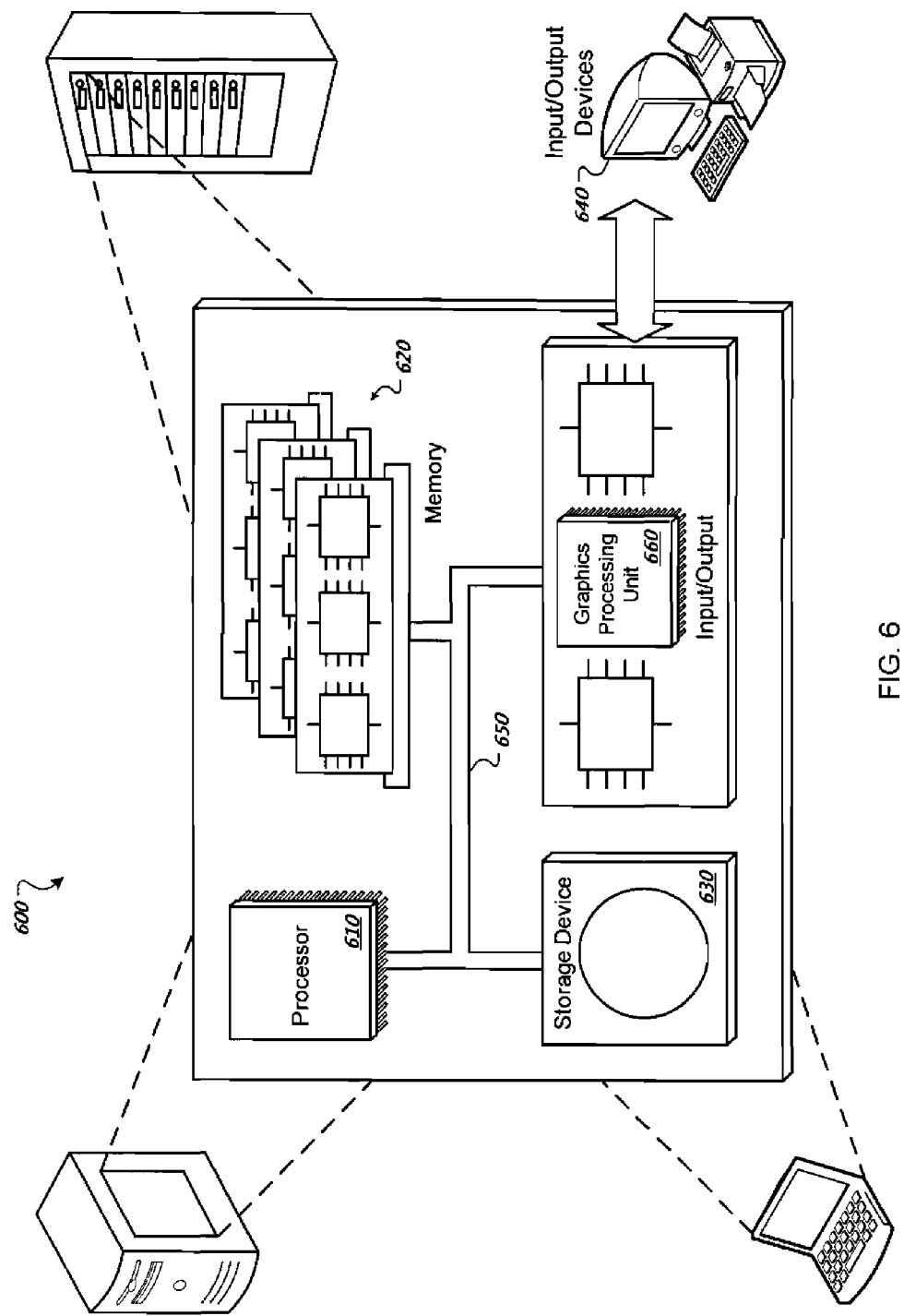
FIG. 6 is a schematic diagram of a computing system that can be used in connection with computer-implemented methods described in this document.

FIG. 6 is a schematic diagram of a generic computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640. In some implementations, the system 600 includes a graphics processing unit (GPU) 660. The graphics processing unit 660 is capable of processing instructions stored in the memory 620, stored on the storage device 630, or instructions provided by the processor 610 to display graphical information for a user interface on the input/output device 640. In some implementations, the GPU has a highly parallel structure that can efficiently manipulate graphics data. In one example, the GPU 660 is used in the compression and processing of data stored in the deep-framebuffer as described above.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks such as internal hard disks and removable disks; magneto-optical disks; and optical disks. Storage devices suitable for tangibly embodying computer program instructions and data include all forms of non-volatile memory, including by way of example semiconductor memory devices such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component such as a data server, or that includes a middleware component such as an application server or an Internet server, or that includes a front-end component such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving shader programming code that is configured to modify an appearance of an image, the shader programming code when received including at least first and second static expressions to be evaluated as part of executing the shader programming code;
generating intermediate values from an evaluation of the first static expression and an evaluation of the second static expression;
determining which intermediate values are duplicative by identifying a first plurality of intermediate values corresponding to the first static expression and a second plurality of intermediate values corresponding to at least the second static expression, wherein each of the first plurality of intermediate values are within a predetermined level of tolerance of each of the corresponding second plurality of intermediate values;
associating the first and second static expressions with a single representation of the duplicative intermediate values, the associating providing that a single representation will be used in place of the first and second static expressions when the shader programming code is executed; and
storing the single representation of the duplicative intermediate values in a buffer accessible to an image rendering application configured to execute the shader programming code.

2. The method of claim 1, wherein the shader programming code comprises instructions within a procedural or fixed shader.

3. The method of claim 1, wherein the intermediate values are stored to the buffer before association occurs.

4. The method of claim 1, wherein the shader programming code comprises instructions implemented in Cg (C for Graphics) shading language.

5. The method of claim 1, wherein associating the first and second static expressions with the duplicative intermediate values occurs as the one or more static expressions are evaluated.

6. The method of claim 1, wherein the buffer comprises a deep-framebuffer.

7. The method of claim 1, further comprising retrieving the stored single representation for an image rendering operation.

8. The method of claim 7, wherein the image rendering operation comprises an image preview operation.

9. The method of claim 1, wherein associating the first and second static expressions with the single representation further comprises storing a pointer that indicates that the duplicative values are represented by the single representation.

10. The method of claim 1, wherein each of the second plurality of intermediate values are identical to each of the corresponding first plurality of intermediate values.

11. The method of claim 1, wherein associating the first and second static expressions with the duplicative intermediate values further comprises storing a pointer that indicates that duplicative values are represented by the single representation.

12. The method of claim 1, further comprising transmitting the single representation to an image rendering application for use in previewing a rendered image or generating a final image.

13. The method of claim 1, wherein a plurality of shading samples contribute to a calculated value of an individual pixel within an image rendered by the image rendering application.

14. A computer-implemented method comprising:
receiving shader programming code that is configured to modify an appearance of an image, the shader programming code when received including at least first and second static expressions to be evaluated as part of executing the shader programming code;
determining which intermediate values generated from an evaluation of the first static expression and an evaluation of the second static expression are duplicative by identifying a first plurality of intermediate values corresponding to the first static expression and a second plurality of intermediate values corresponding to at least the second static expression, wherein each of the first plurality of intermediate values are within a predetermined level of tolerance of each of the corresponding second plurality of intermediate values;
associating the first and second static expressions with a single representation of the duplicative intermediate values, the associating providing that a single representation will be used in place of the first and second static expressions when the shader programming code is executed; and
storing the single representation of the duplicative intermediate values in a buffer accessible to an image rendering application configured to execute the shader programming code.

15. A system comprising:
an expression evaluator for:
receiving shader programming code that is configured to modify an appearance of an image, the shader programming code when received including at least first and second static expressions to be evaluated as part of executing the shader programming code; and
generating intermediate values from an evaluation of the first static expression and an evaluation of the second static expression;
a value comparison module for identifying duplicative intermediate values by identifying a first plurality of intermediate values corresponding to the first static expression and a second plurality of intermediate values corresponding to at least the second static expression, wherein each of the first plurality of intermediate values are within a predetermined level of tolerance of each of the corresponding second plurality of intermediate values; and
a value compression module to:
associate the first and second static expressions with a single representation, the associating providing that a single representation will be used in place of the first and second static expressions when the shader programming code is executed; and to output the single representation to a buffer accessible to an image rendering application configured to execute the shader programming code.

16. A computer-implemented method comprising:

receiving a first and second expressions included in a shader application, the first and second expressions being static during modification of a set of parameters for the shader application, the first and second expressions being included in the shader programming code when received;

generating, based on an evaluation of the first expression and an evaluation of the second expression, values associated with a plurality of shading samples, wherein the values are the same during multiple image re-renderings by an image rendering application using the given set of parameters;

identifying values within the generated values by identifying a first plurality of intermediate values corresponding to a first static expression of the plurality of expressions and a second plurality of intermediate values corresponding to at least one second static expression of the plurality of expressions, wherein each of the first plurality of intermediate values are within a predetermined level of tolerance of each of the corresponding second plurality of intermediate values;

associating the first and second static expressions with a single representation of the generated values, the associating providing that a single representation will be used in place of the first and second static expressions when the shader programming code is executed; and storing the single representation of the generated values in a framebuffer accessible to the image rendering application configured to execute the shader programming code.

17. The method of claim 16, wherein the expressions are identified as static for at least a given set of parameters by comments in programing code of the shader application.

18. The method of claim 16, wherein the parameters indicate only changes to shading samples not in the first shading sample.

* * * * *

UNITED STATES PATENT AND TRADEMARK OFFICE
CERTIFICATE OF CORRECTION

| | | |
|---|---|---|
| PATENT NO. | : 8,395,629 B1 | Page 1 of 1 |
| APPLICATION NO. | : 11/964924 | |
| DATED | : March 12, 2013 | |
| INVENTOR(S) | : Kilpatrick et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1322 days.

Signed and Sealed this
Fourth Day of November, 2014

Michelle K. Lee
*Deputy Director of the United States Patent and Trademark Office*